(12) United States Patent
Harrison et al.

(10) Patent No.: US 6,487,356 B1
(45) Date of Patent: Nov. 26, 2002

(54) FIBER OPTIC CABLE SEGREGATION AND SLACK STORAGE APPARATUS AND METHOD

(75) Inventors: Carl G. Harrison, Plano; Bradley S. Hoyl, Frisco; Denise L. Smart, Plano, all of TX (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 09/628,915

(22) Filed: Jul. 31, 2000

(51) Int. Cl.[7] ............................................. G02B 6/00
(52) U.S. Cl. ............................................. 385/135; 385/59
(58) Field of Search ................................. 385/53, 57, 59, 385/89, 134–137

(56) References Cited

U.S. PATENT DOCUMENTS

| | | | |
|---|---|---|---|
| 4,696,438 A | 9/1987 | Myers | 242/118.41 |
| 4,783,954 A | 11/1988 | Akre | 57/9 |
| 4,792,203 A | 12/1988 | Nelson et al. | 350/96.2 |
| 4,995,688 A | 2/1991 | Anton et al. | 350/96.2 |
| 5,013,121 A | 5/1991 | Anton et al. | 350/96.2 |
| 5,066,149 A | 11/1991 | Wheeler et al. | 385/135 |
| 5,067,678 A | 11/1991 | Henneberger et al. | 248/68.1 |
| 5,179,618 A | 1/1993 | Anton | 385/136 |
| 5,208,894 A | 5/1993 | Johnson et al. | 385/135 |
| 5,214,735 A | 5/1993 | Henneberger et al. | 385/136 |
| 5,265,187 A | * 11/1993 | Morin et al. | 385/135 |
| 5,287,426 A | 2/1994 | Shahid | 385/85 |
| 5,301,884 A | 4/1994 | Horneman | 242/7.09 |
| 5,316,243 A | 5/1994 | Henneberger et al. | 248/68.1 |
| 5,339,379 A | 8/1994 | Kutsch et al. | 385/135 |
| 5,497,444 A | 3/1996 | Wheeler | 385/135 |
| 5,717,810 A | 2/1998 | Wheeler | 385/135 |
| 5,758,002 A | * 5/1998 | Walters | 385/134 |
| 5,758,003 A | 5/1998 | Wheeler et al. | 385/134 |
| 5,761,368 A | 6/1998 | Arnett et al. | 385/134 |
| 5,915,062 A | 6/1999 | Jackson et al. | 385/137 |
| 5,946,440 A | 8/1999 | Puetz | 385/135 |

* cited by examiner

*Primary Examiner*—Khiem Nguyen
(74) *Attorney, Agent, or Firm*—Campbell Stephenson Ascolese LLP

(57) ABSTRACT

An apparatus provides storage for cable slack and also provides for segregation of interface cables on the front of a chassis and for segregation of intrasystem cables on the back of the chassis. A and B copies of intrasystem cables are segregated on opposite sides of the chassis. Cable slack spools are provided at the top and bottom, on each side of the front and rear surfaces. This configuration allows for convenient cable slack storage for both top-entry and bottom-entry cables.

18 Claims, 13 Drawing Sheets

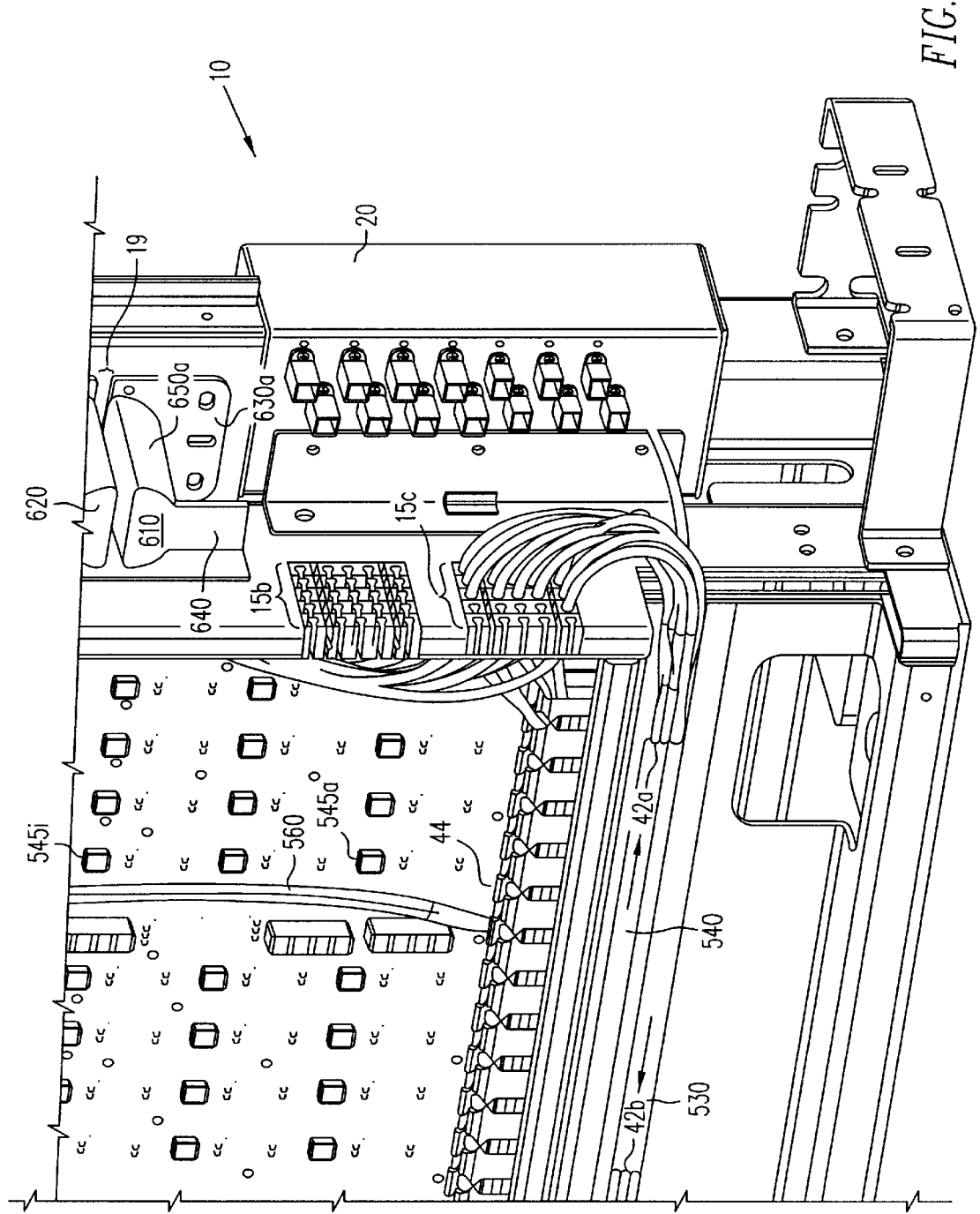

FIBER OPTIC CABLE SEGREGATION AND SLACK STORAGE APPARATUS AND METHOD

BACKGROUND OF THE INVENTION

1. Field of the Invention

This invention relates to telecommunications equipment and, more particularly, to a ystem for segregating, organizing, and storing fiber optic cables.

2. Description of the Related Art

Fiber optic cables are utilized in communication systems for carrying information between communication sources and sinks. An example of a communication system that utilizes fiber optic cable is an optical cross connect for a communications network.

Fiber optic cable typically includes at least one glass core for optical, high bandwidth transmission of information. Typically, fiber optic cable requires a minimum bending radius (e.g., a one-inch bending radius) to avoid damaging the glass core and to avoid producing a large dB loss in the transmission of information through the cable.

To interconnect fiber optic cable, fiber retainer systems have been developed. An example of a fiber retainer frame system is shown in commonly assigned U.S. Pat. App. No. 09/604355, filed Jun. 27, 2000, entitled "Optical Connector Retainer Panel and System", by inventors Bradley S. Hoyl, Denise L. Smart, and Carl G. Harrison, which is herein incorporated by reference in its entirety. The fiber retainer system disclosed therein includes a chassis that carries a plurality of connector retainer panels. The connector retainer panels, in turn, carry a plurality of adapters. Each adapter permits the attachment of a fiber optic connector to both sides of the adapter in order to couple two fiber optic cables. The connector retainer panel disclosed therein allows for a high density of fiber optic cables to be housed within the fiber retainer frame system.

Provision for high-density fiber optic systems has become more necessary as the use of fiber optic cables in the telecommunications industry has increased. By density, it is meant the number of locations per unit volume or unit area for providing connections between fiber optic cables on the chassis. One problem associated with high-density fiber retainer systems is the need to avoid bending of the fiber optic cables in excess of their minimum bending radius. In addition, the high density creates a need for an organizational system that provides convenient access to the cables in order for technicians and test personnel to readily access a particular cable that needs to be removed, replaced, or otherwise accessed. It is also desirable for redundant cables to be placed so that one accidental physical interruption does not interrupt both redundant cables.

Another problem associated with high-density fiber retainer systems is related to cable slack. In order to facilitate the mating of fiber optic connectors, most fiber optic cables terminate with a connector that is capable of being inserted into one side of an adapter. When the connector of a second fiber optic cable is inserted into the other side of the adapter, a connection is established between the first and second cables. It is difficult, expensive, and time-consuming to cut the cable to the exact length needed for the terminating end of the cable to reach its intended adapter within the fiber retainer system. Even when technicians work from blueprints or detailed plans, their attempts to pre-cut the cables to the exact required length are often unsuccessful, resulting in cables that are either too long or too short. In order to avoid having cables that are cut too short and are therefore not usable, many technicians intentionally cut cables so that they are too long. The excess length of cable over what is required for the cable to meet its intended adapter is referred to herein as cable slack. Slack must be stored within the fiber retainer system in a manner that takes up as little space as possible while, at the same time, protecting the cables from being folded in a bend radius that is smaller than their minimum bend radius.

What is needed is an improved system for segregating cables within a fiber retainer system so that the fibers are readily accessed, redundant cables are segregated from each other, and excess cable slack is stored efficiently without damaging the cables.

SUMMARY OF THE INVENTION

Apparatus, system, and method are disclosed for keeping cables segregated and for keeping cable slack stored. An apparatus is disclosed, the apparatus having a chassis that includes a front surface, a rear surface, a first side and a second side. In at least one embodiment, the rear surface is configured to form a substantially hollow rear access opening. In at least one embodiment, the rear access opening includes support structures for software cards, telecommunications adapters, and the like. The chassis includes an upper portion and a lower portion. Each side of the chassis has an outer surface and an inner surface, the inner surface of each side forming a part of the perimeter of the rear access opening.

The apparatus includes a mounting panel coupled to the outer surface of the first side of the chassis. The mounting panel has a front surface and a rear surface, and may be mounted so that its front surface and rear surfaces face the same direction as the front and rear surfaces of the chassis. The mounting panel includes an upper portion and a lower portion.

The apparatus includes a first and second cable slack storage assemblies. Each cable slack storage assembly includes an upper and lower cable spool assembly. The cable spool assemblies may be cable slack spool assemblies that are designed for cable slack storage. Each of the cable spool assemblies, and therefore each of the cable slack storage assemblies, has a distal end and a proximal end. The proximal ends of the cable slack storage assemblies are coupled to the chassis. In at least one embodiment, this coupling is accomplished by mounting the cable slack storage assemblies to the mounting panel which is, in turn, coupled to the chassis. The first cable slack storage assembly is coupled to the upper front surface of the mounting panel. The second cable slack storage assembly is coupled to the lower front surface of the mounting panel. The chassis further includes an exterior vertical routing channel. The vertical routing channel is formed as a vertical depression along the outer surface of the first side of the chassis.

Additional embodiments of the apparatus include a third cable slack storage assembly coupled to the upper rear surface of the mounting panel and a fourth cable slack storage assembly coupled to the lower rear surface of the mounting panel.

An additional embodiment of the chassis includes a second exterior intrasystem cable duct coupled to the rear surface of the chassis. Additional embodiments of the chassis further include at least one vertical first side cable duct coupled to the inner surface of the first side of the chassis and at least one vertical second side cable duct coupled to the inner surface of the second side of the chassis. An additional embodiment of the chassis further includes second exterior vertical routing channel formed as a vertical depression along the outer surface of the second side. The chassis further includes at least one horizontal internal cable duct horizontally traversing the access opening.

A system for storing at least one pair of redundant cables is disclosed, where the pair of redundant cables includes a first cable and a second cable. The system includes a plurality of chassis, which includes at least one line chassis, with each chassis having a front surface, a back surface, a first side, and a second side. Each chassis in the system further includes at least one exterior horizontal cable duct coupled to its back surface. Each of the line chassis further includes four cable slack storage assemblies. The first and second cable slack storage assemblies are associated with an upper portion of the back surface, the first being associated with a first side of the chassis and the second being associated with the second side of the chassis. The third and fourth cable slack storage assemblies are associated with a lower portion of the back surface, the third being associated with the first side of the chassis and the fourth being associated with the second side of the chassis. In at least one embodiment, the first and third cable slack storage assemblies are capable of providing cable slack for the first of the redundant cables and the second and fourth cable slack storage assemblies are capable of providing cable slack for the second of the redundant cables. In at least one embodiment, the chassis further includes four additional cable slack storage assemblies. The fifth and sixth cable slack storage assemblies are associated with an upper portion of the front surface, the fifth being associated with a first side of the chassis and the sixth being associated with the second side of the chassis. The seventh and eight cable slack storage assemblies are associated with a lower portion of the front surface, the seventh being associated with the first side of the chassis and the eighth being associated with the second side of the chassis. In at least one embodiment, the fifth and seventh cable slack storage assemblies are capable of providing cable slack for the interface cable. In at least one other embodiment, the sixth and eighth cable slack storage assemblies are capable of providing cable slack for the interface cable.

A system for storing at least one interface cable is disclosed. The system includes a plurality of chassis, which includes at least one line chassis, with each chassis having a front surface, a back surface, a first side, and a second side. Each chassis in the system further includes at least one exterior horizontal cable duct coupled to its back surface. Each of the line chassis further includes four cable slack storage assemblies. The first and second cable slack storage assemblies are associated with an upper portion of the front surface, the first being associated with a first side of the chassis and the second being associated with the second side of the chassis. The third and fourth cable slack storage assemblies are associated with a lower portion of the front surface, the third being associated with the first side of the chassis and the fourth being associated with the second side of the chassis. In at least one embodiment, the first and third cable slack storage assemblies are capable of providing cable slack for the interface cable. In at least one other embodiment, the second and fourth cable slack storage assemblies are capable of providing cable slack for the interface cable.

A method of providing cable storage is disclosed, comprising the steps of storing one or more interface cables on the front surface of a line bay chassis, storing one or more intrasystem cables on the back surface of a line bay chassis, storing an A copy of the redundant intrasystem cables on a first side of the line bay, and storing a B copy of the redundant intrasystem cables on a second side of the line bay. The method further includes providing cable slack storage for interface cables on first and second front cable slack storage assemblies and providing cable slack storage for redundant intrasystem cables on a first and second back cable slack storage assemblies.

A system of providing cable storage is disclosed. The system includes a plurality of line bay chassis, each chassis having a means for routing intrasystem cables among the plurality of chassis. The system further includes a means for storing one or more interface cables on the front surface of a line bay chassis, a means for storing one or more intrasystem cables on the back surface of a line bay chassis, a means for storing an A copy of the redundant intrasystem cables on a first side of the line bay, and a means for storing a B copy of the redundant intrasystem cables on a second side of the line bay. The system further includes a means for providing cable slack storage for interface cables on first and second front cable slack storage assemblies and a means for providing cable slack storage for redundant intrasystem cables on a first and second back cable slack storage assemblies

BRIEF DESCRIPTION OF THE DRAWINGS

The present invention may be better understood, and its numerous objects, features, and advantages made apparent to those skilled in the art by referencing the accompanying drawings.

FIG. 6A is an expanded rear view of the lower A-side portion of a dual-redundant cable slack and storage segregation system utilizing at least one embodiment of a line bay chassis.

DETAILED DESCRIPTION

Figure 1:
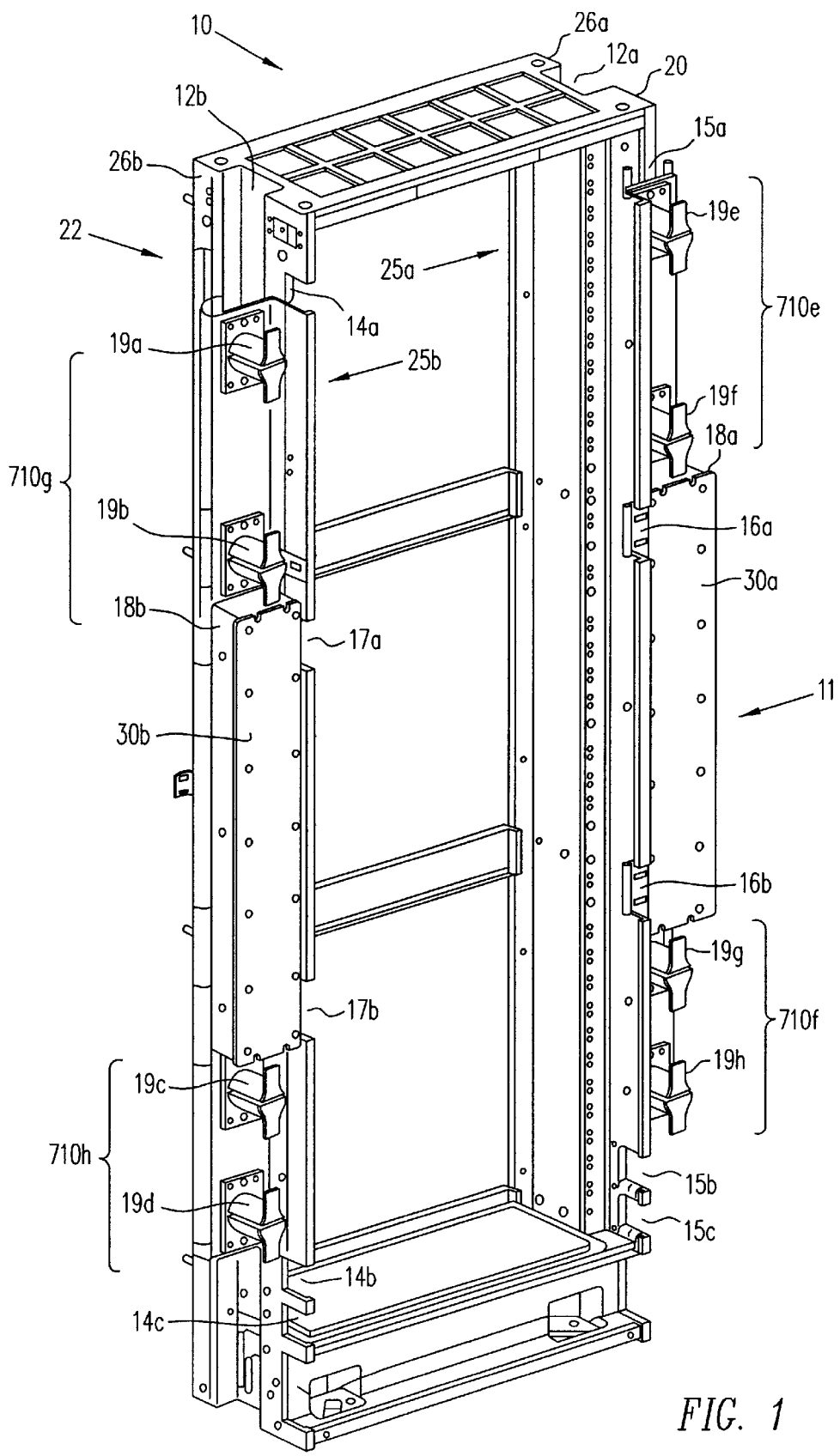
FIG. 1 is an isometric rear view of at least one embodiment of a line bay chassis.

FIG. 1 illustrates a line bay chassis 10. The line bay chassis 10 includes features that provide cable slack storage and also includes features that provide at least two different aspects of cable segregation. In addition, the line bay chassis 10 also includes features that provide the versatility to accommodate either top-entry or bottom-entry cables, or both. Regarding cable segregation, the line bay chassis 10 includes features that support the segregation of dual-redundant intrasystem cables. The line bay chassis 10 also includes features that support the segregation of intrasystem cables from interface cables. Intrasystem cables are the cables that carry signals and information internal to a software telecommunications routing system, including timing signals and other control signals. Interface cables, on the other hand, carry the telecommunications traffic (input and output) that is managed by the software telecommunications routing system. In a typical system, the interface cables carry telephone and internet traffic that is routed by the software routing system.

Figure 2:
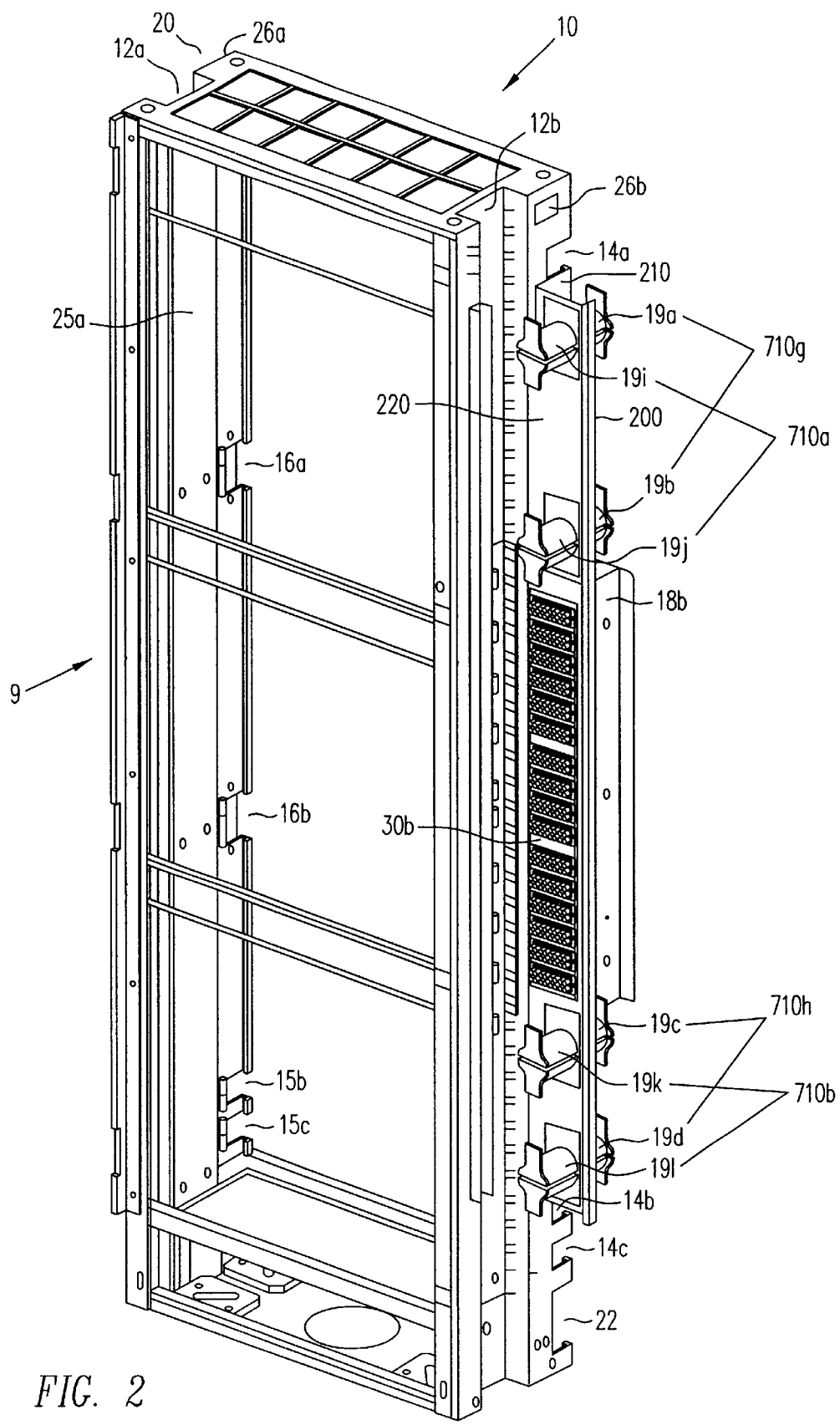
FIG. 2 is an isometric front view of at least one embodiment of a line bay chassis.

FIGS. 1 and 2 illustrate that the line bay chassis 10 is a relatively hollow rectangular-shaped frame have a front side 9 and a rear side 11. The line bay chassis 10 has a first side 20 and a second side 22. The first side 20 is herein referred to as the "A side" and the second side 22 is herein referred to as the "B side". This terminology reflects the fact that the line bay chassis 10 includes features that provide for segregation of redundant copies of intrasystem cables. For instance, in a system that uses dual-redundant "A" and "B" intrasystem cables, the A and B copies of cables are segregated. That is, A-copy intrasystem cables are retained on the A-side of the chassis 10 while all B-copy intrasystem cables are retained on the B side of the chassis 10.

The line bay chassis 10 includes a plurality of cable slack spool assemblies 19i–19l and 19m–19p (FIG. 8) associated with the front side 9 and a plurality of cable slack spool assemblies 19a–19h associated with the rear side 11. The line bay chassis 10 includes at least one cable slack storage assembly 710g on the upper portion of the back surface 11, the cable slack storage assembly 710g including cable slack spool assemblies 19a and 19b. In at least one embodiment, the slack storage assembly 710g is associated with the B side 22 of the line bay chassis 10, while a second cable slack storage assembly 710e, including cable slack spool assemblies 19e and 19f, is associated with the upper portion of the A side 20 of the rear side 11 of the line bay chassis 10. The line bay chassis 10 also includes at least one cable slack storage assembly 710a on the upper portion of the front surface 9, the cable slack storage assembly 710a including cable slack spool assemblies 19i and 19j. In at least one embodiment, the slack storage assembly 710a is associated with the B side 22 of the line bay chassis 10, while a second cable slack storage assembly 710c (FIG. 8), including cable slack spool assemblies 19m and 19n, is associated with the upper portion of the A side 20 of the front surface 9 of the line bay chassis 10.

FIGS. 1 and 2 illustrate that the cable slack spool assemblies are positioned so that both top-entry and bottom-entry cables have convenient, separate cable slack spool assemblies to provide slack storage. For instance, cable slack storage for top-entry cables is provided by cable slack spool assemblies 19i and 19j, which are positioned on the upper half of the line bay chassis 10. In contrast, cable slack storage for bottom-entry cables is provided by cable slack spool assemblies 19k and 19l, which are positioned on the lower half of the line bay chassis 10. Alternatively, the top and bottom cable slack spool assemblies, such as 19i, 19j and 19k, 19l, respectively, may both be used for cables that enter from the same direction. Such an application is especially useful in dense systems involving so much fiber that cable slack for all fibers cannot reasonably fit one set of cable slack spool assemblies.

FIG. 2 illustrates that, in at least one embodiment, the cable slack storage assemblies 710, which each includes one or more cable slack spool assembly 19, are mounted on a mounting panel 200. At least one embodiment of the mounting panel 200 is a relatively elongated L-shaped member having two orthogonal planar edges 210, 220 coupled together. A first of the planar edges 210 is coupled to the outer surface 26 of one of the sides 20, 22 of the chassis. The second edge 220 provides a planar surface to which the cable slack spool assemblies 19 are mounted. The second edge 220 has a front surface and a rear surface. The cable slack spool assemblies 19i–19p associated with the front surface 9 of the chassis 10 are coupled to the front surface of the second edge 220 of the mounting panel, the front surface 9 of the chassis 10 and the front surface of the mounting panel 200 each facing the same direction. Similarly, the cable slack spool assemblies 19a–19h associated with the rear surface 11 of the chassis 10 are coupled to the rear surface of the second edge 220 of the mounting panel 200, the rear surface 11 of the chassis 10 and the rear surface of the second edge 220 of the mounting panel 200 each facing the same direction.

FIGS. 1 through 6B, including 6A, illustrate several features of the line bay chassis 10 that support segregation of redundant intrasystem cables. Two ducts 530, 540 capable of storing intrasystem cables are coupled to the exterior of the rear side 11 of the line bay chassis, near the bottom of the chassis 10. In at least one embodiment of a cable slack storage and segregation system, the A-cable exterior intrasystem cable duct 540 is used to store A-copy intrasystem cables and the B-cable exterior intrasystem cable duct 530 is used to store B-copy intrasystem cables. Of course, one could use duct 530 to store A-copy cables and could use duct 540 to store B-copy cables. In either case, the A- and B-copies of redundant cables are segregated from each other by virtue of the physically distinct exterior intrasystem cable ducts 530, 540. One skilled in the art will recognize that placement of the exterior intrasystem cable ducts 530, 540 is very flexible in that almost any position on the rear side 11 will suffice. The embodiment illustrated in FIGS. 5 and 6 readily supports storage of bottom-entry cables, such as cables that run underneath a mesh computer flooring material. However, exterior intrasystem cable ducts 530, 540 can be placed near the top of the line bay chassis to support top-entry intrasystem cables, or can be placed at any other position (such as midline, vertical placement, etc.) on the line bay chassis 10.

FIG. 6A illustrates an embodiment of a cable slack storage and segregation system wherein the A-copy cables 42a are stored in the A-cable exterior intrasystem cable duct 540 and B-copy redundant cables 42b are stored in the B-cable exterior intrasystem cable duct 530. The A-copy cables 42a enter the duct 540 from the B side (not shown) of the chassis 10 and exit the duct 540 on the A side 20 of the chassis 10.

FIG. 6A illustrates that the B-copy cables 42b enter the duct 530 from the A side 20 of the chassis 10.

Figure 6B:
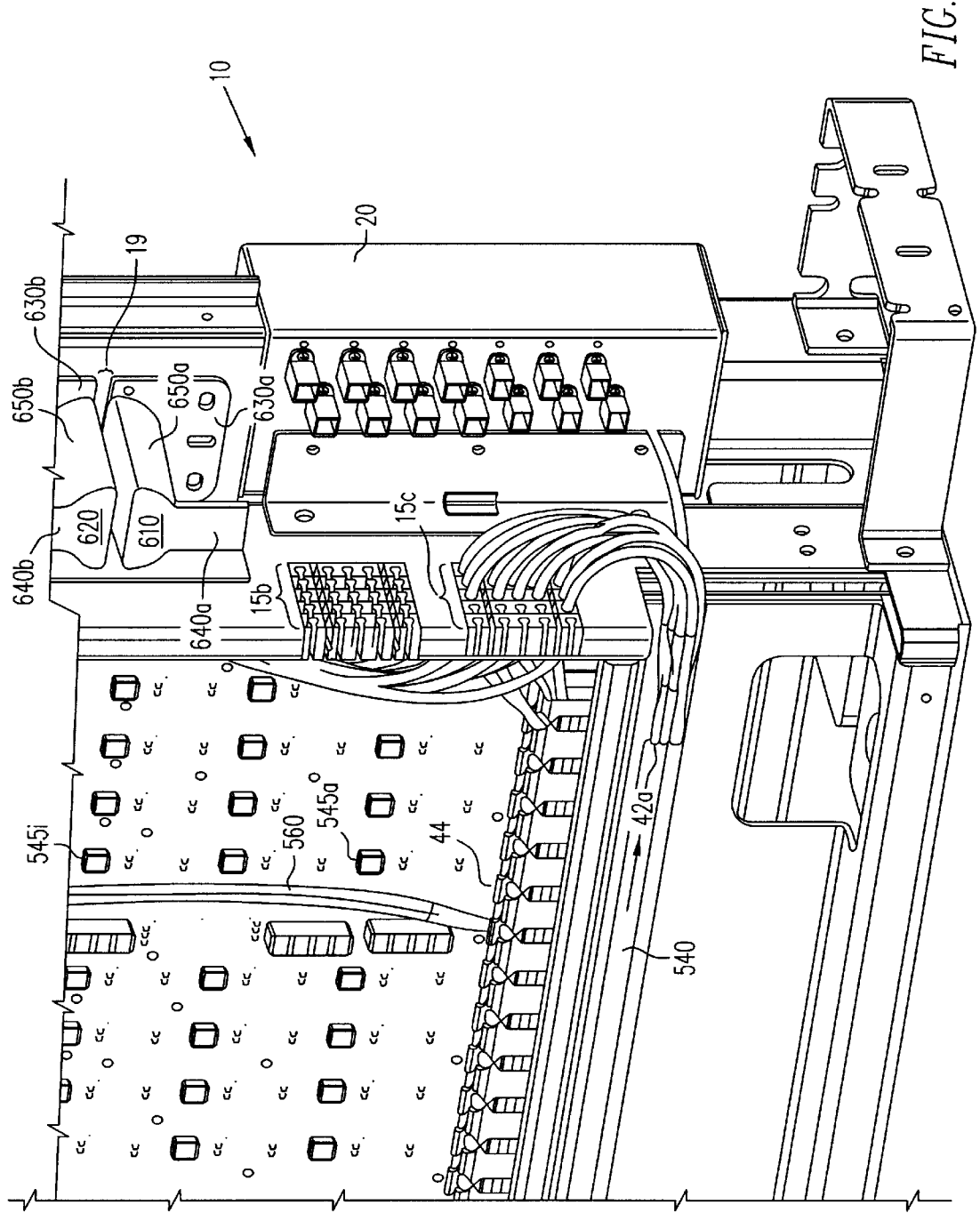
FIG. 6B is an expanded rear view of the lower A-side portion of cable slack and storage segregation system utilizing at least one embodiment of a line bay chassis.
Figure 9:
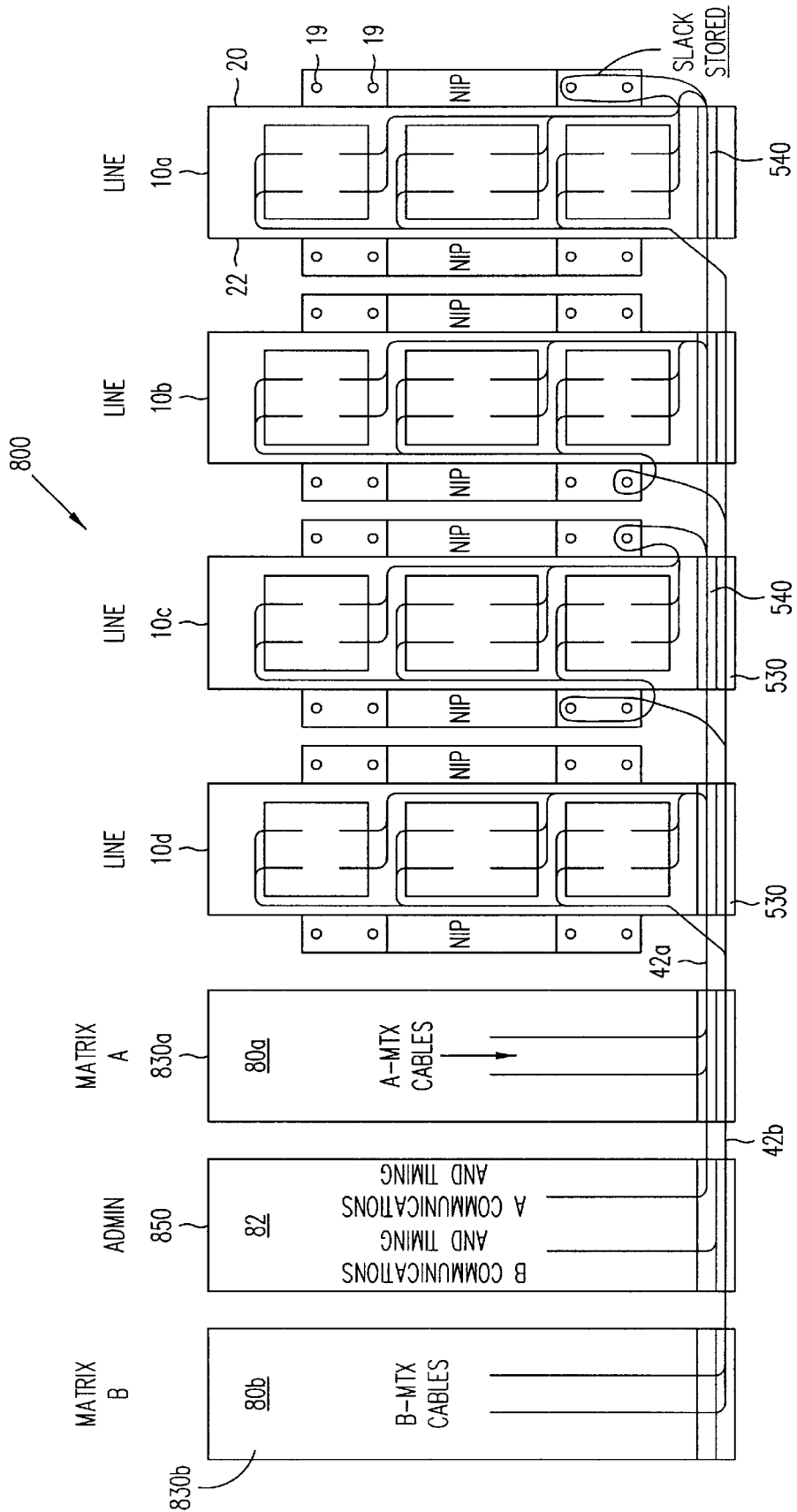
FIG. 9 is a rear view block diagram of a cable slack and storage segregation system utilizing a plurality of line bay chassis according to one aspect of the present invention.

FIGS. 6B and 9 illustrate an embodiment of a line bay chassis that includes only a single exterior intrasystem cable duct 540 for the intrasystem cables 42a. This chassis 10 can be used as the terminal chassis in a cable slack storage and segregation system. For instance, the chassis 10 illustrated in FIG. 6B can be used as the terminal chassis 10a in a system 800, such as that illustrated in FIG. 9, that uses four line bay chassis. FIG. 9 illustrates that the terminal chassis 10a has the B-copy intrasystem cables 42b routed up the B side of the chassis 10a, with no need for the cables 10a to traverse the back surface 11. In contrast, the A-copy intrasystem cables 42a traverse the chassis 10a via the single exterior intrasystem cable duct 540 in order to be routed up the A side 20 of the chassis 10a. The single-duct chassis 10 illustrated in FIG. 6B can also be used in systems that either do not use redundant copies of intrasystem cables or do not require segregation of A- or B-copies of intrasystem.

FIGS. 1, 5, 6A and 6B illustrate that the chassis 10 contains several interbay passthrough ports 14, 15, 16, 17. Ports 14 and 15 are apertures that allow cables to pass through the A side 20 of the chassis 10. Ports 16 and 17 are apertures that allow cables to pass through the B side 22 of the chassis 10. The ports 14, 15, 16, 17 are configured to receive the cables 42 after they exit the exterior intrasystem ducts 530, 540, allowing the cables 42 to pass from the outside of the chassis 10 to the interior. In at least one embodiment, ports 15a, 15b, 15c are relatively small A-side passthrough ports; the other A-side passthrough ports 16a and 16b are larger than the smaller ports 15a, 15b, 15c. One skilled in the art will recognize that the relative sizes of the ports 14, 15, 16, 17 may vary depending on many factors such as the desired cable entry point and number of fiber cables in the system. For instance, the passthrough ports 14, 15, 16, 17 may be all of a uniform size, or, in the alternative, may each be a different size from the others.

Figure 5:
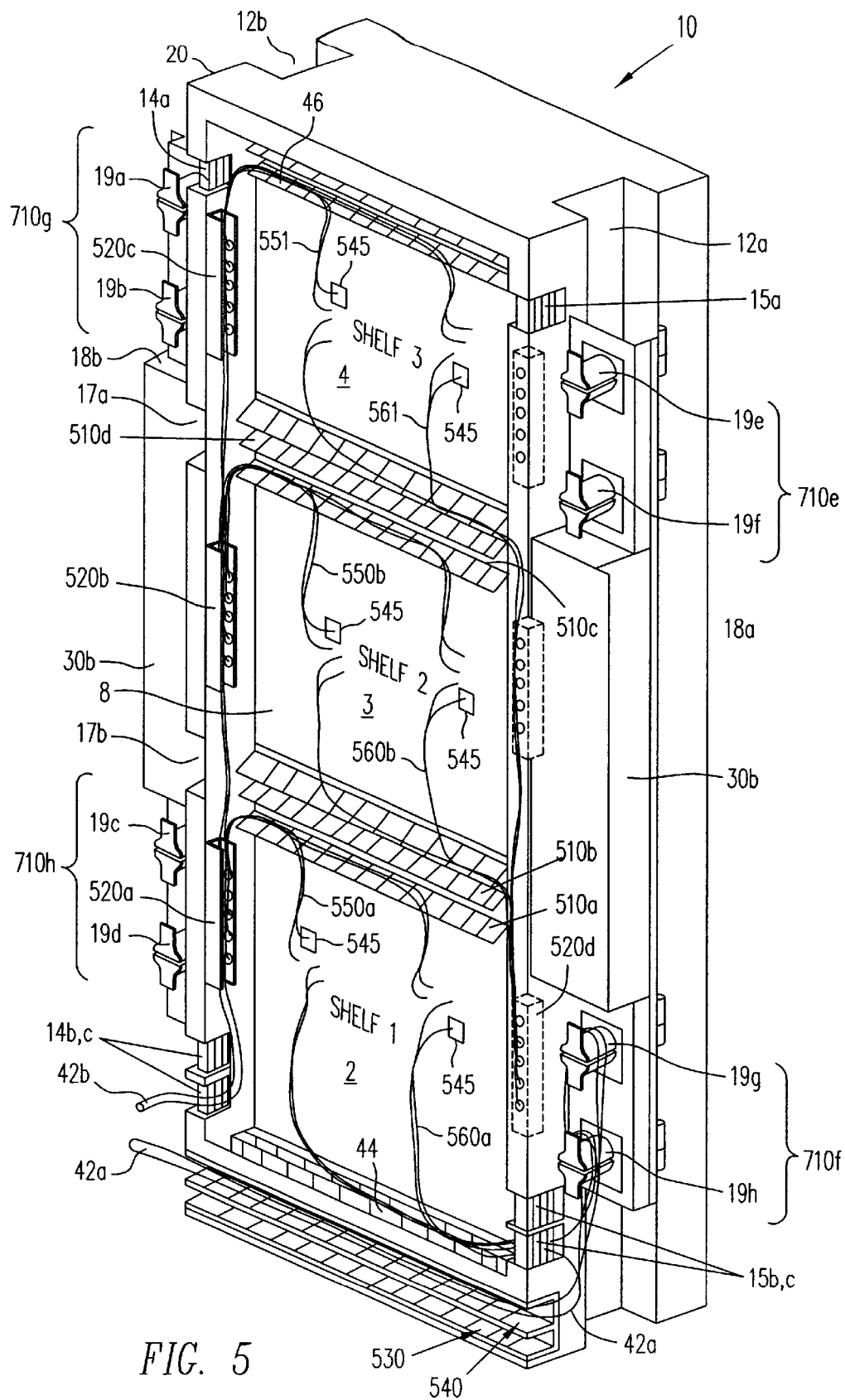
FIG. 5 is a rear view of a cable slack and storage segregation system utilizing a line bay chassis according to one aspect of the present invention.

FIGS. 5, 6A, and 6B illustrate that at least one embodiment of the chassis 10 includes a horizontal internal cable duct 44 running horizontally along the bottom rear portion of the hollow interior of the chassis 10. The hollow interior bounded at the perimeter by the rear side of the frame-like chassis is referred to herein as the rear access opening 8. In at least one embodiment, the horizontal internal cable duct 44 that runs horizontally along the bottom of the rear access opening 8 is configured to receive and store the A-side cables 42a after they enter the interior of the chassis via one of the lower A-side passthrough ports 15b, 15c. From the horizontal internal cable duct 44, the cables "dress up" to have their terminating end placed in a connector adapter 545 that is housed in the rear access opening 8. When a cable dresses up, it is positioned in a relatively vertical direction from a lower initiating end to a higher terminating end. For instance, cable 560 is an A-side cable that dresses up from the horizontal internal cable duct 44 to an adapter 545n.

FIG. 5 illustrates that the chassis 10 also includes several other horizontal internal cable ducts including one or more interior horizontal internal cable ducts 510a, 510b, 510c, 510d and a top horizontal internal cable duct 46. The horizontal cable ducts 44, 510, 46 each run along the top or bottom of a subsection of the rear access opening 8. It will be understood that the sides 20, 22 of the chassis each have an inner surface and an outer surface. The inner surface of the sides 20, 22 form the side perimeter boundaries of the rear access opening 8. Accordingly, the A-side interior horizontal cable ducts 510a, 510b, are coupled to the inner surface of the A side 20 of the chassis 10. By the same token, the B-side interior horizontal cable ducts 510c, 510d, are coupled to the inner surface of the B side 22 of the chassis 10.

Figure 7:
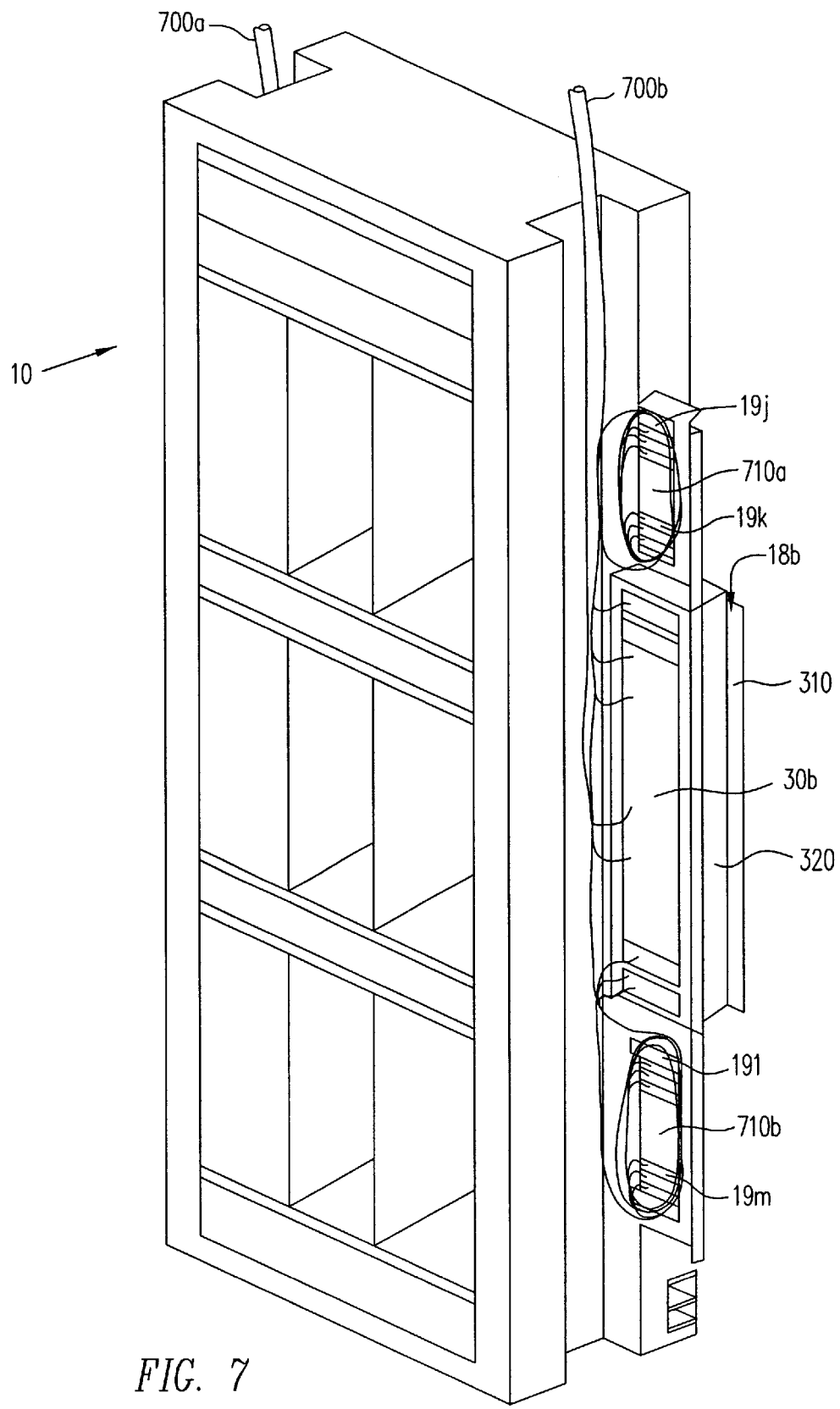
FIG. 7 is a front orthogonal view of a cable slack and storage segregation system utilizing at least one embodiment of a line bay chassis.

FIGS. 1, 5, and 7 illustrate that, in at least one embodiment, the rear access opening is divided into three subsections, with each subsection being capable of accommodating a shelf of adapters 545. The bottom horizontal internal cable duct 44 is positioned to run along the bottom edge of a first subsection 2. A first interior horizontal internal cable duct 510a is positioned to run along the top edge of the first subsection 2. A second interior horizontal internal cable duct 510b is positioned to run along the bottom of a second subsection 3, and a third interior horizontal internal cable duct 510c is positioned to run along the top of the second subsection 3. A third interior horizontal internal cable duct 510d is positioned to run along the bottom of a third subsection 4. The top horizontal internal cable duct 46 is positioned to run along the top of the third subsection 4. A horizontal internal cable duct is therefore provided along the top and bottom of each of three subsections 2, 3, 4 of the rear access opening 8.

FIG. 5 illustrates that, in at least one embodiment of a cable slack storage and segregation system, the chassis 10 provides for segregation of A- and B-side copies of redundant cables in the following manner. A-copy cables 42a are stored along the A side 20 of the chassis 10 while B-copy cables 42b are stored along the B side 22 of the chassis 10. Specifically, for example, bottom-entry B-copy cables 42b are routed along the B-cable exterior intrasystem cable duct 530 and, if necessary, cable slack is stored in the B-side bottom rear cable slack storage assembly 710h, which includes an upper cable slack spool assembly 19c and a lower cable slack spool assembly 19d. With slack appropriately stored, the B-copy cables 42b enter the interior of the chassis 10 by passing through one of the B-side passthrough ports 14, 17. If a cable needs to travel up the interior of the chassis from its entry point at a passthrough port 14, 17, it travels along one or more vertical internal cable ducts 520. In at least one embodiment, there are three B-side internal cable ducts 520a, 520b, 520c, where each is associated with a subsection 2, 3, 4, respectively, of the rear access opening 8. Similarly, an A-side internal cable duct 520d, 520e, 520f is provided for each of the subsections 2, 3, 4, respectively.

FIG. 5 illustrates that A-side cables 42a dress up from one of the lower horizontal internal cable ducts 44, 510b, 510d to an adapter 545 in the appropriate subsection 2, 3, 4, respectively. For example, A-copy cable 560a dresses up from the bottom horizontal internal cable duct 44 to an adapter 545 in the first subsection 2. A-copy cable 560b travels vertically along the A-side internal cable duct 520d associated with the first subsection 2 and enters the interior horizontal internal cable duct 510b that runs along the bottom of the second subsection 3. From the duct 510b, the cable dresses up to an adapter 545 in the second subsection 3. A-copy cable 561 travels vertically along the A-side internal cable ducts 520d and 520e and enters the interior horizontal internal cable duct 510d that runs along the bottom edge of the third subsection 4. From the duct 510d, the cable 561 dresses up to an adapter 545 in the third subsection 4.

FIG. 5 illustrates that B-side cables 42b dress down from one of the upper horizontal internal cable ducts 510a, 510c, 46 to an adapter 545 in the appropriate subsection 2, 3, 4, respectively. For example, B-copy cable 550a travels vertically along the B-side internal cable duct 520a associated with the first subsection 2 and enters the interior horizontal internal cable duct 510a that runs along the top edge of the first subsection 2. The cable 550a dresses down from the horizontal internal cable duct to an adapter 545 in the first subsection 2. B-copy cable 550b travels vertically along the B-side internal cable duct 520a associated with the first subsection 2 and along the B-side internal cable duct 520b associated with the second subsection 3 and enters the interior horizontal internal cable duct 510c that runs along the top of the second subsection 3. From the duct 510c, the cable 550b dresses down to an adapter 545 in the second subsection 3. B-copy cable 551 travels vertically along the B-side internal cable ducts 520a, 520b and 520c and enters the top horizontal internal cable duct 46 that runs along the top edge of the third subsection 4. From the duct 44, the cable 551 dresses down to an adapter 545 in the third subsection 4.

In the manner described in the foregoing paragraphs, A-copy cables 42a and B-copy cables 42b are segregated from each other on opposing sides 20, 22 of the chassis 10. With the dress up/dress down approach described above, redundant cables do not cross each other. Accordingly, it is less like that a single event, such as the accidental backing of heavy equipment into the side of a line bay chassis 10, will disturb or sever both cables in a particular pair of redundant cables.

FIGS. 1, 2, 5 ,7 and 8 illustrate that the line bay chassis 10 includes features that provide for segregation of intrasystem cables from interface cables. Generally, interface cables 700 are stored on the front side 9 of the line bay chassis 10 while intrasystem cables 42a, 42b, 550, 551, 560, 561 are stored on the rear side 11 of the line bay chassis. More specifically, both intrasystem and interface cables may run along the sides 20, 22 of the line bay chassis 10. However, cable slack storage 19i–19p and adapters 346 (FIG. 3) for the terminating ends of interface cables 700 are associated with the front surface 9 of the line bay chassis 10. In contrast, cable slack storage 19a–19h and adapters 545 for the terminating ends of intrasystem cables 42a, 42b,550, 551, 560, 56 are associated with the rear surface 11 of the line bay chassis 10. As used herein, the terms front side and front surface are used interchangeably to refer to any portion of the line bay chassis that faces the same direction as the front surface 9 of the line bay chassis 10, whether the portion is planar with the front surface 9 or not. Similarly, the terms rear side, back side, back surface, and rear surface are used interchangeably to refer to any portion of the line bay chassis 10 that faces the same direction as the rear surface 11 of the line bay chassis 10, whether the portion is planar with the rear surface 11 or not.

Figure 3:
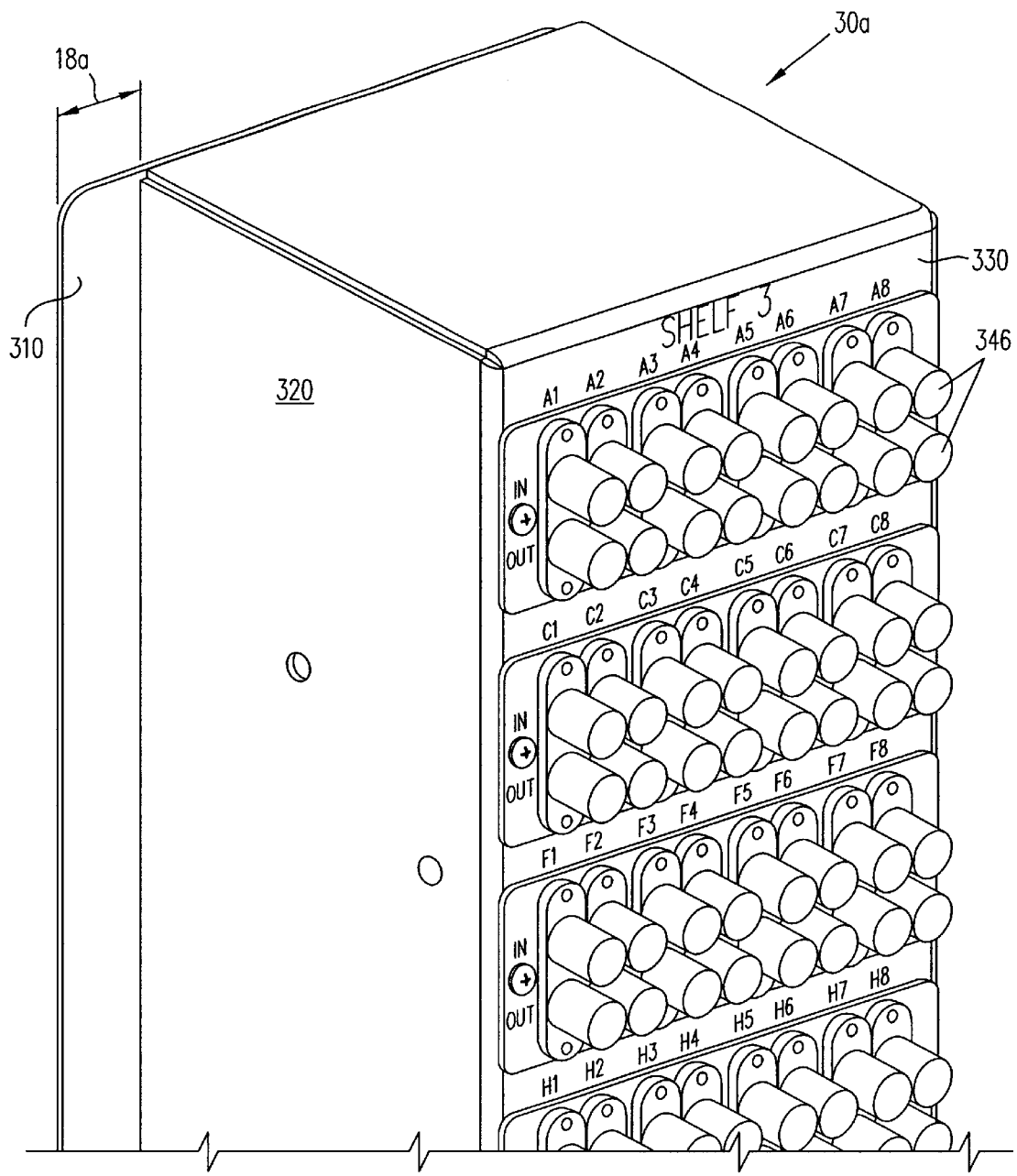
FIG. 3 is a front left-side view of at least one embodiment of a network interface panel.

FIGS. 3 and 7 illustrate the cable slack storage and segregation features of the line bay chassis 10 that relate to interface cables 700a, 700b. In at least one embodiment of a cable slack storage and segregation system, the interface cables 700a, 700b are top-entry cables that originate in overhead troughs (not shown) affixed to the ceiling or other overhead feature of the room in which the cable slack storage and segregation system is located. The terminating ends of the interface cables 700a, 700b can be connected to connectors 346 on a network interface panel (NIP) 30. In at least one embodiment, the NIP 30 is coupled to the line bay chassis 10 such that the front surface 330 of the NIP faces the same direction as the front surface 9 of the line bay chassis 10.

Figure 8:
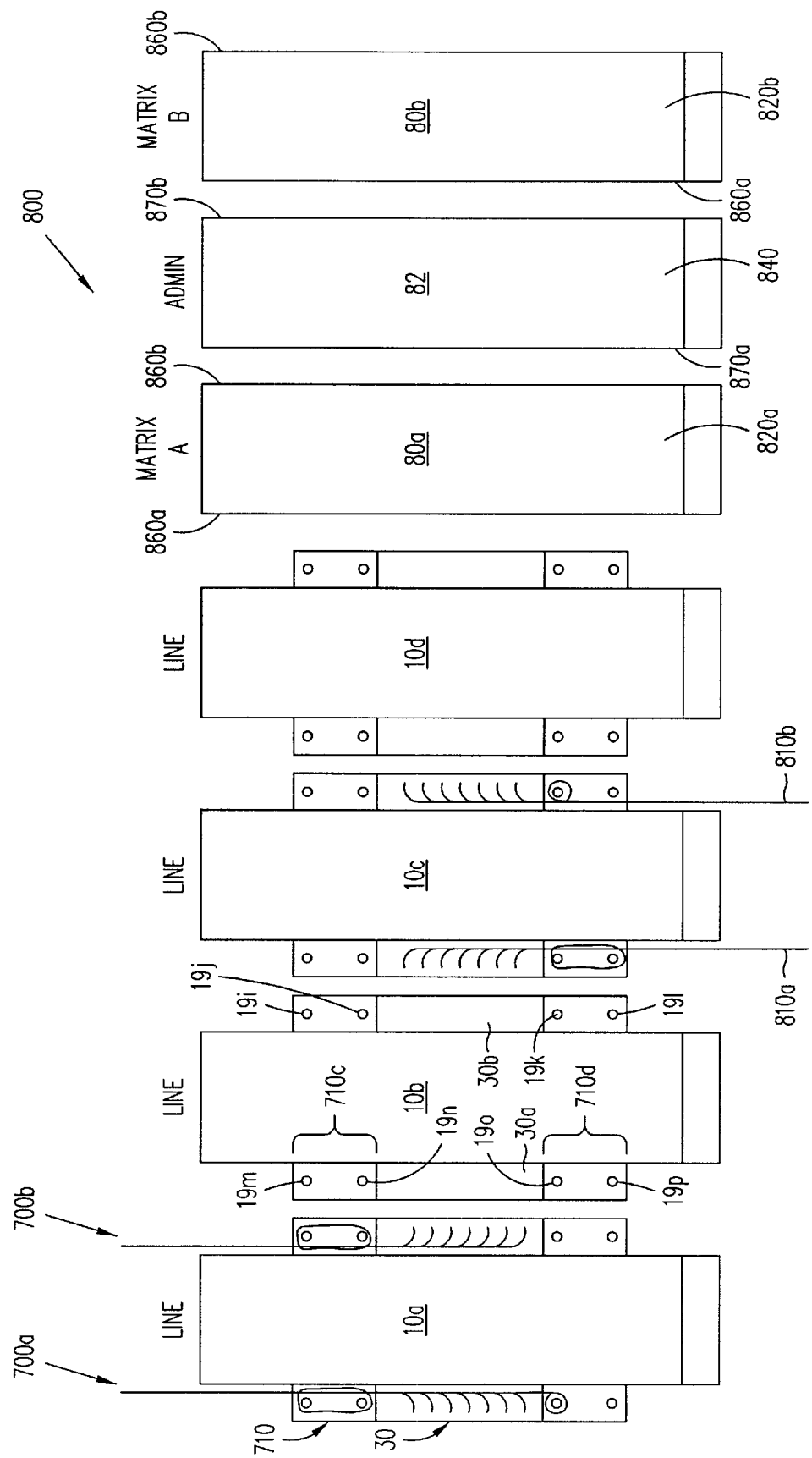
FIG. 8 is a front view block diagram of a cable slack and storage segregation system utilizing a plurality of line bay chassis according to one aspect of the present invention.

FIG. 8 illustrates that, in at least one embodiment, a first NIP 30a is coupled to the first side 20 of the line bay chassis 10 and a second NIP 30b is coupled to the second side 22 of the line bay chassis 10. This arrangement is helpful in dense systems where there is a relatively large number of fiber cables that would be difficult to place on a single panel. In at least one embodiment, this arrangement can also be used to facilitate segregation of dual-redundant copies of interface copies, but the utility of the two-NIP arrangement is not limited to such dual-redundant schemes. One will further note that the placement of the NIP 30 at the horizontal midline of the line bay chassis 10 facilitates placement of upper cable spool assemblies 19i, 19j, 19m, 190n on the upper portion of the line bay chassis 10 and also facilitates the placement of lower cable spool assemblies 19k, 19l, 19o, 19p on the lower portion of the line bay chassis 10. This placement of upper and lower cable spool assemblies results in the cable slack storage and segregation system being able to provide storage slack for top-entry cables, bottom-entry cables, or both.

FIG. 1 illustrates that the upper/lower cable spool assembly arrangement is mimicked on the rear side 11 of the line bay chassis 10. Lower cable spool assemblies 19c, 19d, 19g, 19h and upper cable spool assemblies 19a, 19b, 19e, 19f facilitate cable slack storage for both top-entry and bottom-entry intrasystem cables.

FIGS. 1, 2, 3, 7 and 8 illustrate that the outer surfaces 26a, 26b of sides 20, 22, respectively, of the line bay chassis are each shaped to form a vertical routing channel 12a, 12b, respectively, that provides vertical storage for interface cables 700a, 700b. The interface cables 700a, 700b enter the routing channel 12a, 12b, any slack is stored on the front cable slack spool assemblies 19i–19p, if necessary, and the terminating end of each of the interface cables is then placed into one or more adapters 346 on the NIP 30a, 30b. In this manner, the cable slack for interface cables 700a, 700b is stored on the front surface 9 of the line bay chassis, and the terminating ends of the interface cables 700a, 700b are placed into adapters on the front of the line bay chassis 10, by virtue of being placed into adapters 346 on the front surface 330 of the NIP 30. This segregates the interface cables 700a, 700b from the intrasystem cables 42a, 42b, 550, 551, 560, 56, which are slack-stored and terminated on the rear surface 11 of the line bay chassis 10.

FIG. 6A and FIG. 6B illustrate the cable slack spool assembly 19 in detail. The spool assembly 19 comprises an upper portion 620 and a lower portion 610. Each portion 620, 610 has a distal end (the end farthest from the line bay chassis 10) and a proximal end (the end closest to the line bay chassis 10) and includes a winding base 650b, 650a, respectively. The winding bases 650a, 650b are designed to come into contact with one or more fiber optic cables. When cable slack is wrapped around the winding base 650a, 650b the cables are maintained at a winding radius that is equal to or greater than their minimum winding radius, by virtue of the radius of the winding base 650a, 650b.

The proximal end of each winding base 650a, 650b is coupled, at a relatively orthogonal angle, to a mounting flange 630a, 630b, respectively. The mounting flanges 630a, 630b are the proximal ends of the lower portion 610 and the upper portion 620, respectively, and provide a planar surface for coupling the lower portion 610 and upper portion 620, respectively, to the line bay chassis 10. In at least one embodiment, the mounting flanges 630a, 630b are coupled to the second edge 220 (FIG. 2) of the mounting panel 200 (FIG. 2). FIG. 6 illustrates that the spool assembly 19 also includes an upper retaining structure 640b and a lower retaining structure 640a. The retaining structures 640b, 640a are coupled to the distal end of each winding base 650b, 650a, respectively, and provide a wall against which the cable slack, when round around the winding bases 650b, 650a, may be contained without slipping off the distal end of the spool assembly 19.

FIGS. 1, 2, 5, 7, and 8 illustrate that, in at least one embodiment, a cable slack storage assembly 710 includes two cable slack spool assemblies 19. For instance, cable slack storage assembly 710a includes cable slack spool assemblies 19i and 19j, cable slack storage assembly 710b includes cable slack spool assemblies 19k and 19l, cable slack storage assembly 710c includes cable slack spool assemblies 19m and 19n, cable slack storage assembly 710d includes cable slack spool assemblies 19o and 19p, cable slack storage assembly 710e includes cable slack spool assemblies 19e and 19f, cable slack storage assembly 710f includes cable slack spool assemblies 19g and 19h, cable slack storage assembly 710g includes cable slack spool assemblies 19a and 19b, and cable slack storage assembly 710h includes cable slack spool assemblies 19c and 19d.

FIG. 8 illustrates at least one embodiment of a cable slack storage and segregation system 800 that provides intrasystem/interface cable segregation and A-copy/B-copy segregation while, at the same time, providing sufficient cable slack storage for a dense cable application. The system 800 is appropriate for storage of fiber optic cable slack because cable slack is stored in a manner so as not to exceed the minimum bend radius for the fiber cables 700a, 700b, 810a, 810b. FIG. 8 illustrates that the system 800 includes a plurality of chassis 10a, 10b, 10c, 10d, 80a, 80b, 82. The system accommodates both top-entry interface cables 700a, 700b as well as bottom-entry interface cables 810a, 810b. In at least one embodiment, the system 800 includes four line bay chassis 10a, 10b, 10c, 10d. The line bay chassis 10a, 10b, 10c, 10d provide the mechanism for coupling the interface cables with an adapter on the front side of the chassis and mating the interface cables with a corresponding intrasystem cable by coupling the corresponding intrasystem cable to the adapter on the back side of the chassis. The system 800 also includes two matrix bays 80a, 80b. Each matrix bay 80a, 80b, includes a front surface 820a, 820b, respectively. Each matrix bay 80a, 80b also includes a first side 860a and a second side 860b. Each matrix bay 80a, 80b houses a dual-redundant copy of application components. In at least one embodiment, the matrix bays 80a, 80b contain dual redundant copies of cards containing cross-connecting and telecommunications switching software. The system 800 also includes an administrative bay 82 that contains system control components. In at least one embodiment, the administrative bay 82 provides a housing and connector adapters for cards that provide dual-redundant timing and control signals. The administrative bay 82 includes a front surface 840, a first side surface 870a, and a second side surface 870b.

FIG. 9 provides a rear view of at least one embodiment of a cable slack storage and segregation system 800. The originating ends of the B-copy cables carrying signals to and from one set of the dual-redundant matrix software cards are housed in connector adapters associated with the back surface 830b of the B matrix bay 80b. The originating ends of the A-copy cables carrying signals to and from the other set of the dual-redundant matrix software cards are housed in connector adapters associated with the back surface 830a of the A matrix bay 80a. The originating ends of both the A-copy and B-copy cables carrying signals to and from both sets of dual redundant administrative software cards are housed in connector adapters associated with the back surface 850 of the administrative bay 82.

FIG. 9 illustrates that each of the chassis 10a, 10b, 10c, 10d, 80a, 80b, 82 in the system 800 contain a B-cable exterior intrasystem cable duct 830 and an A-cable exterior intrasystem cable duct 540. Each of the B-copy cables 42b originating in the B matrix bay 80b and each of the B-copy cables originating in the administrative bay 82 traverses the B-cable exterior intrasystem cable duct 530 in one or more of the chassis 10a, 10b, 10c, 10d, 80a, 80b, 82, terminating in an adapter in one of the line bays 10a, 10b, 10c, 10d. Similarly, cable storage for the A-copy intrasystem cables 42a is provided by the A-copy exterior intrasystem cable duct 540. Each of the A-copy cables 42a originating in the A matrix bay 80a and each of the A-copy cables originating in the administrative bay 82 traverses the A-cable exterior intrasystem cable duct 530 in one or more of the chassis 10a, 10b, 10c, 10d, 80a, 80b, 82, terminating in an adapter in one of the line bays 10a, 10b, 10c, 10d.

Figure 10:
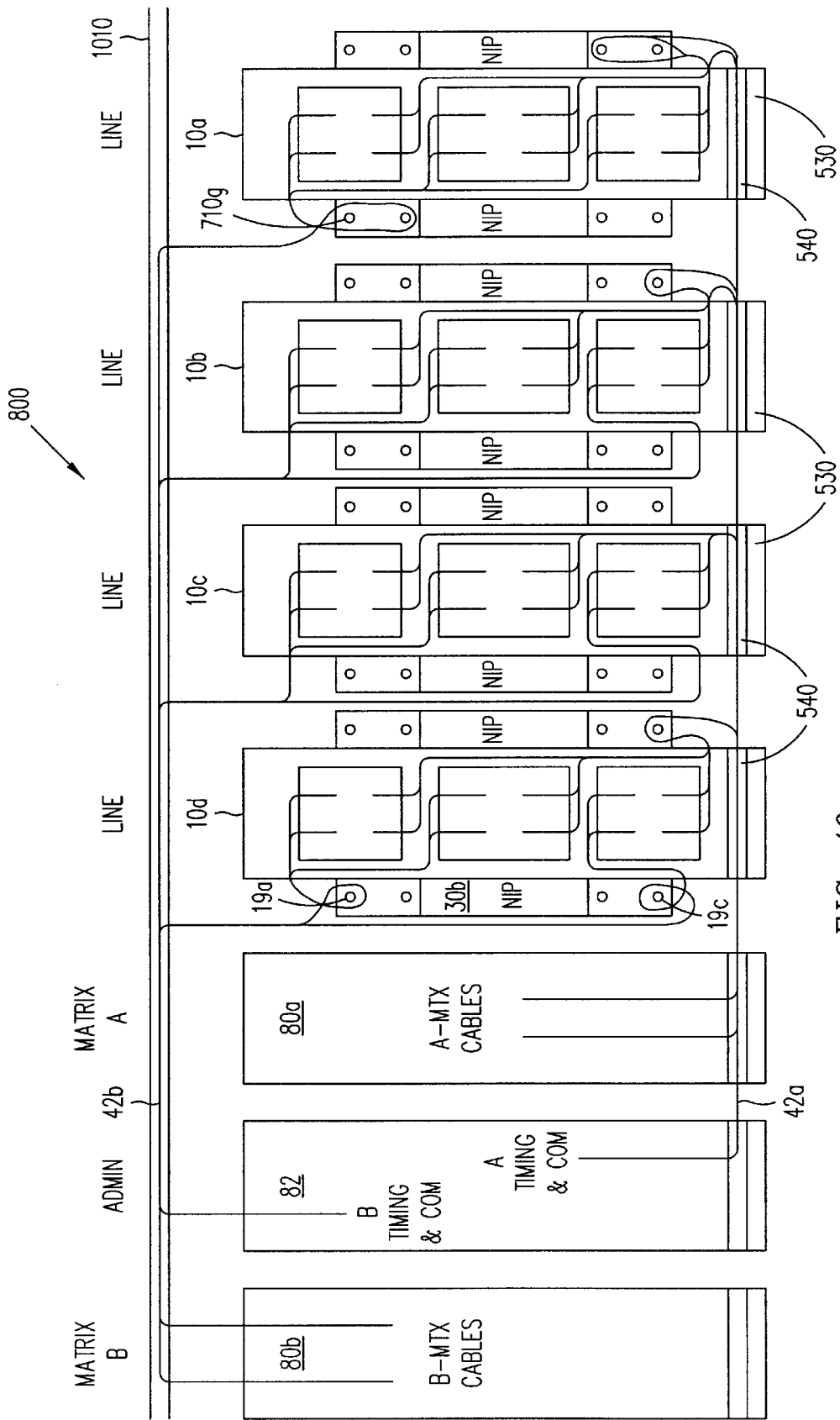
FIG. 10 is a rear view block diagram of a second embodiment of a cable slack and storage segregation system utilizing a plurality of line bay chassis according to one aspect of the present invention.

FIG. 10 illustrates an alternative method for routing cables 42a, 42b within a cable slack storage and segregation system 800. Rather than utilizing a B-cable exterior intrasystem cable duct 530, B-copy intrasystem cables 42b are routed through an overhead cable duct 1010. One skilled in the art will recognize that the goal of intrasystem cable segregation could also be accomplished by routing the A-copy intrasystem cables 42a, rather than the B-copy cables, through the overhead cable duct 1010. In either case, the remaining cables 42a or 42b are routed through one of the exterior intrasystem cable ducts 530, 540.

In order to accommodate the alternative routing illustrated in FIG. 10, the cable slack storage and segregation system 800 utilizes one or more vertical intrasystem routing channels 18.

Figure 4:
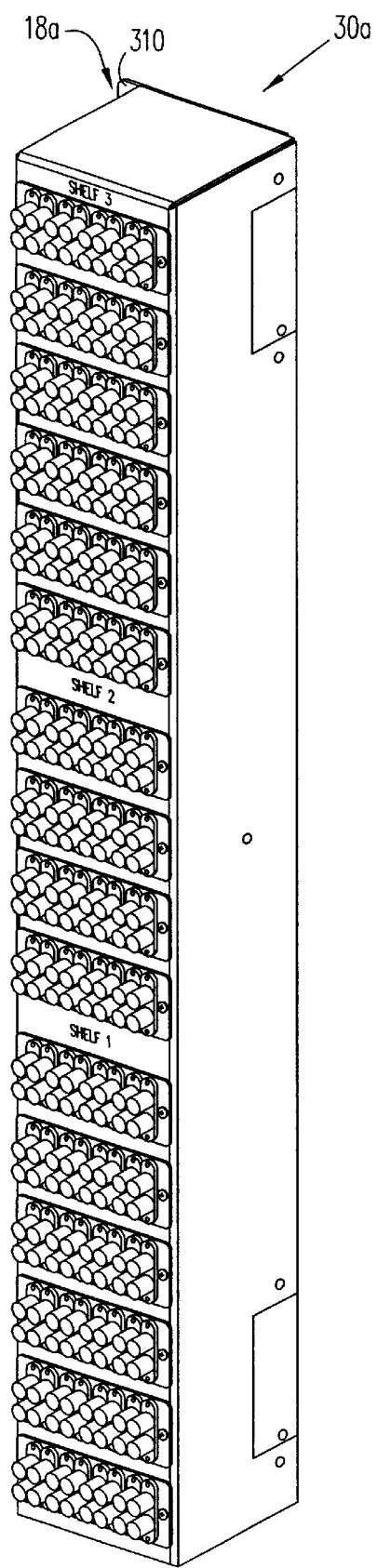
FIG. 4 is a front right-side view of at least one embodiment of a network interface panel.

FIGS. 1–5 and 7 illustrate the intrasystem routing channels 18a, 18b on the line bay chassis 10. The intrasystem routing channels 18a, 18b are formed as part of the NIP's 30a, 30b, respectively. FIGS. 3 and 4 illustrate that at least one embodiment of the routing channel 18a is formed by the coupling of a side panel 320 of the NIP 30a with a rear mounting panel 310, the rear mounting panel extending to the side of the NIP 30a to form a routing channel 18a bounded on one side by the side panel 320 of the NIP 30a. FIG. 7 illustrates that a mirror-image arrangement on the B-side of the line bay chassis 10 results in a B-side routing channel 18b being formed by the coupling of a side panel 320 of the NIP 30b with a rear mounting panel 310. In at least one embodiment, the side panel 320 and the rear mounting panel 310 are mounted together in an orthogonal orientation in relation to each other. An orthogonal orientation is not necessary to practice the present invention, however, and any orientation will suffice so long as the result is a channel 18 in which cables 42b can be stored.

Returning to FIG. 10, the B-copy cables 42b originating from the B matrix bay 80b and the B-copy cables originating from the administrative bay 82 are routed from their originating bays 80b, 82 toward the appropriate line bay chassis 10a, 10b, 10c, 10d via the overhead cable duct 1010. The B-copy cables 42b are routed along the vertical intrasystem routing channel 18b on the B-side 22 of the line bay chassis 10 where each cable 42b terminates. Cable slack is stored, if necessary, on one or more of the rear cable slack spool assemblies 19a–19h before dressing down to terminate in an adapter housed in the appropriate line bay chassis 10. FIG. 10 illustrates the utility of the two-spool cable slack storage assembly 710 described above in connection with FIG. 6A and FIG. 6B. For example, cable slack for B-copy cables 42b terminating in line bay chassis 10d is stored on a single spool 19a, 19c. That is, the two-spool configuration 710 allows for a single spool to be used for storage of relatively short slack, and allows both spools to be used for storage of relatively longer slack. For instance, both spools of cable slack storage assembly 710g are used to store longer slack associated with line bay chassis 10a in FIG. 10.

Figure 11:
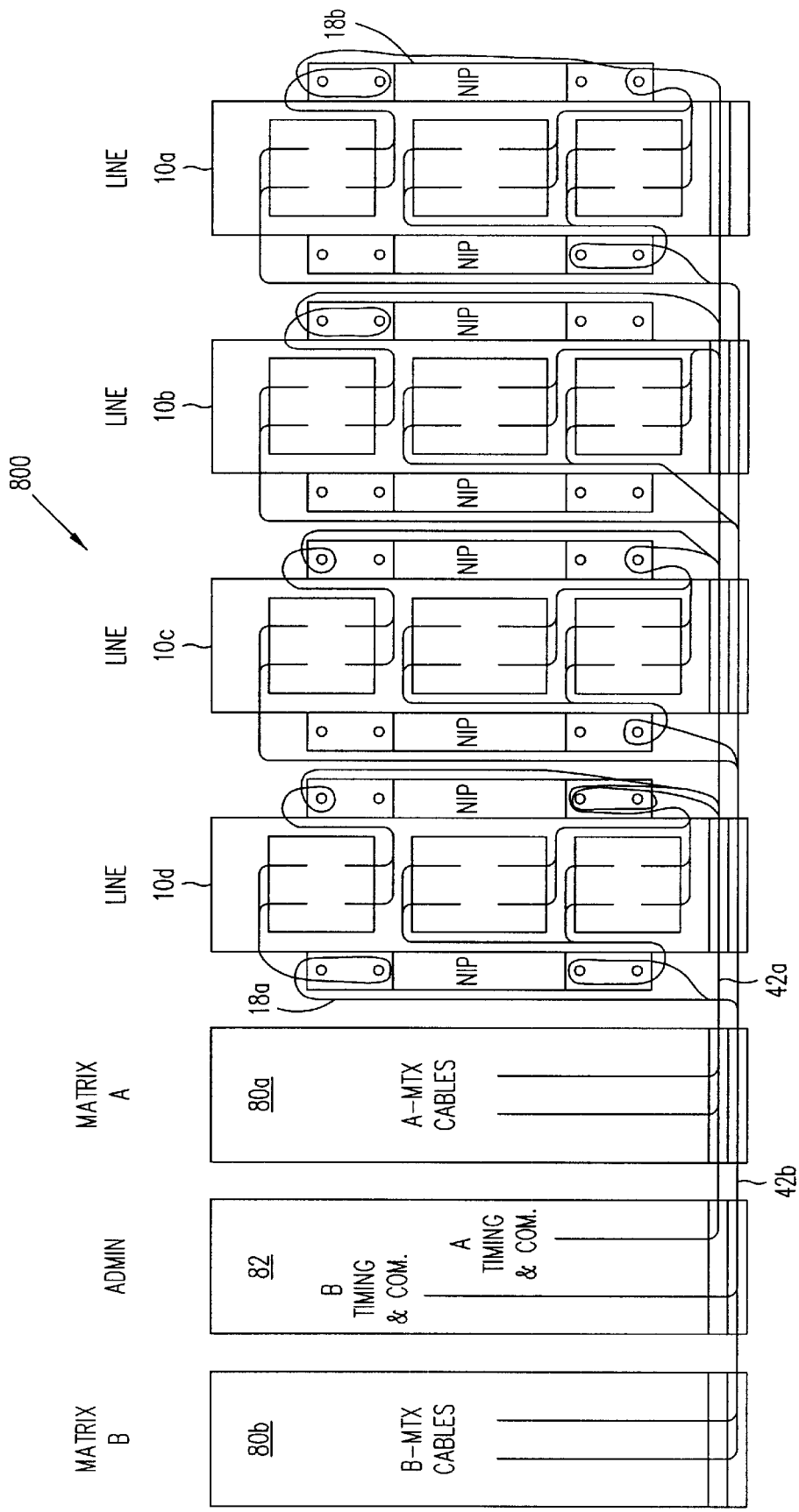
FIG. 11 is a rear view block diagram of a third embodiment of a cable slack and storage segregation system utilizing a plurality of line bay chassis according to one aspect of the present invention.

FIG. 11 illustrates a second alternative method of routing cables 42a, 42b in a cable slack storage and segregation system 800. Rather than running along vertical internal cable ducts 520 (FIG. 5), intrasystem cables 42a, 42b are routed along the exterior vertical intrasystem routing channels 18a, 18b.

Figure 12:
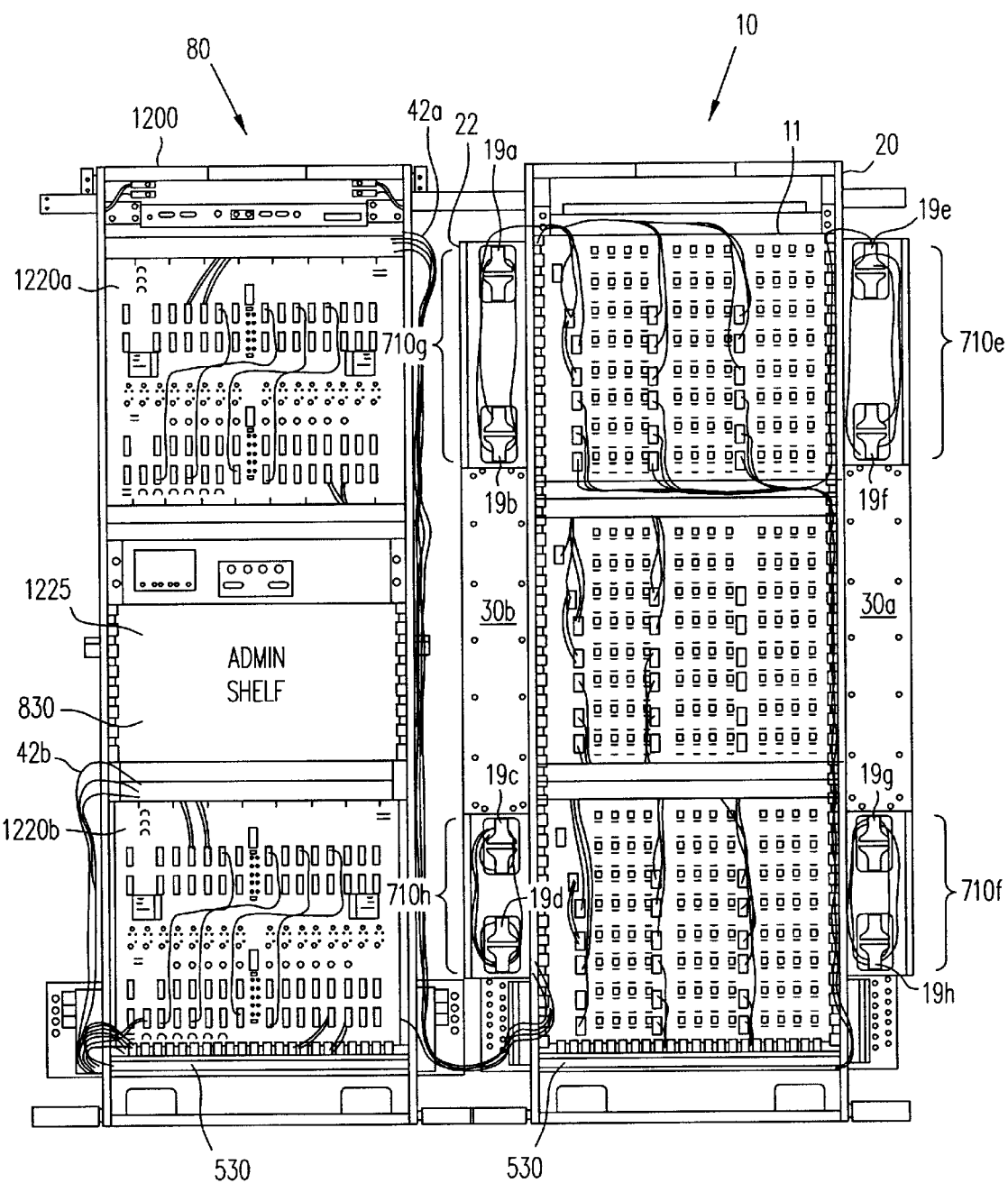
FIG. 12 is a rear view block diagram of a cable slack and storage segregation system. The use of the same reference symbols in drawings indicates identical items unless otherwise noted.

FIG. 12 illustrates at least one alternative embodiment of a cable slack storage and segregation system 1200. Rather than having separate matrix and administrative bays, the A-copy 1220a and B-copy 1220b matrix software and the administrative timing and control software 1225 are all stored on the same matrix bay 80. Each of the chassis 10, 80 has an exterior horizontal cable duct 530 on the back surface 11, 830, respectively, that may be used to route intrasystem cables between the chassis 10, 80. The system 1200 includes a plurality of intrasystem cables 42, the intrasystem cables including a plurality of redundant pairs 42a, 42b. Each of the plurality of cables 42a, 42b has an originating end and a terminating end. The originating ends of the cables 42a, 42b are connected to adapters in the matrix bay 80. The terminating ends are routed to the appropriate adapter housed in the line bay chassis 10.

Alternative Embodiments

Other embodiments are within the scope of the following claims.

Referring to cable slack storage assembly 710f in FIG. 7 as an example, one can see that, in at least one embodiment, the cable slack, when stored on a cable slack storage assembly 710f, only touches the upper portion 620 of the upper spool 19g and the lower portion 610 of the lower spool 19h. One skilled in the art will therefore recognize that, in an alternative embodiment, a cable slack storage assembly 710 need only include a single upper portion 620 and a lower portion 610, rather than two of each portion 610, 620.

One skilled in the art will recognize that some prior art systems angle the connector adapters 346 downwardly toward the floor in order to avoid ocular damage due to laser energy emitted from the terminating ends of fiber optic cables. The present invention can be modified to accommodate an angled approach. For instance, one skilled in the art will recognize that the terms "front side" and "rear side" may be understood to include portions of the line bay chassis 10 that, while facing relatively the same direction of the front surface 9 and rear surface 11, respectively of the chassis 10, are also angled downwardly toward the floor. Accordingly, cable slack spool assemblies 19i and 19j are understood to be "associated with the front surface" 10 of the chassis, even though the assemblies 19i, 19j may be angled towards the floor rather than having their distal ends face exactly the same direction that the front surface 9 of the chassis 10 faces.

One skilled in the art will further recognize that the cable slack spool assemblies 19 could be mounted directly to the chassis 10 rather than the mounting panel 200. In addition, the mounting panel could be formed as an integral part of the chassis frame 10.

One skilled in the art will further recognize that the vertical routing channels 12 need not be formed into the sides 20, 22 of the chassis 10, but could also be formed as a separate trough or duct that is then coupled to the sides 20, 22 of the chassis 10. Similarly, the horizontal cable ducts 44, 46, 510 the vertical internal cable ducts 520, and the exterior intrasystem cable ducts 530, 540 can each either be formed into the frame of the chassis 10 or can, alternatively, be formed as a separate component that is coupled to the chassis 10.

One skilled in the art will recognize that the cable slack storage spools 19 need not necessarily be spools. Rather, any cable storage means known in the art will suffice for storage of cable slack, so long as the minimum bending radius of the cables is not exceeded. Some examples of alternative storage mechanisms include posts, reels, reels with arcuate surfaces, FIG. 8 shaped storage devices, wheels, take-up frames, cable management devices and modules, troughs and fittings.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. An apparatus, comprising:

a chassis having a front surface, a rear surface, a first side, and a second side, the rear surface being configured to form a substantially hollow rear access opening, the chassis having an upper portion and a lower portion, the first side having an outer surface and an inner surface, and the second side having an outer surface and an inner surface, a mounting panel coupled to the outer surface of the first side of the chassis, the mounting panel having a front surface and a rear surface and also having an upper portion and a lower portion;

a first upper cable spool assembly having a proximal end and a distal end;

a first lower cable spool assembly having a proximal end and a distal end, the first upper cable spool assembly and the first lower cable spool assembly comprising a first cable slack storage assembly, the proximal ends of the first lower cable spool assembly and the first lower cable spool assembly being coupled to the upper portion of the front surface of the mounting panel;

a second upper cable spool assembly having a proximal end and a distal end;

a second lower cable spool assembly having a proximal end and a distal end, the second upper cable spool assembly and the second lower cable spool assembly comprising a second cable slack storage assembly, the proximal ends of the second upper cable spool assembly and the second lower cable spool assembly being coupled to the lower portion of the front surface of the mounting panel; and an exterior vertical cable channel formed as a vertical depression along the outer surface of the first side.

2. The apparatus recited in claim 1, further comprising:

a horizontal exterior intrasystem cable duct coupled to the rear surface of the chassis.

3. The apparatus recited in claim 1, further comprising:

a third upper cable spool assembly having a proximal end and a distal end; and a third lower cable spool assembly having a proximal end and a distal end, the third upper cable spool assembly and the third lower cable spool assembly comprising a third cable slack storage assembly, the proximal ends of the third upper cable spool assembly and the third lower cable spool assembly being coupled to the upper portion of the rear surface of the mounting panel.

4. The apparatus recited in claim 3, further comprising:

a fourth upper cable spool assembly having a proximal end and a distal end; and a fourth lower cable spool assembly having a proximal end and a distal end, the fourth upper cable spool assembly and the fourth lower cable spool assembly comprising a fourth cable slack storage assembly, the proximal ends of the fourth upper cable spool assembly and the fourth lower cable spool assembly being coupled to the lower portion of the rear surface of the mounting panel.

5. The apparatus recited in claim 4, further comprising:
at least one horizontal internal cable duct horizontally traversing the rear access opening.

6. The apparatus recited in claim 2, further comprising:
a second horizontal exterior intrasystem cable duct coupled to the rear surface of the chassis.

7. The apparatus recited in claim 1, further comprising:
a second exterior vertical cable routing channel formed as a vertical depression along the outer surface of the second side.

8. The apparatus recited in claim 1, further comprising:
at least one vertical cable duct coupled to the inner surface of the first side.

9. The apparatus recited in claim 1, further comprising:
at least one vertical cable duct coupled to the inner surface of the second side.

10. The apparatus recited in claim 1, further comprising:
a plurality of horizontal internal cable ducts horizontally traversing the rear access opening, the plurality comprising a bottom horizontal internal cable duct, a top horizontal internal cable duct, and an interior horizontal cable duct.

11. The apparatus recited in claim 1, wherein the first side is configured to form an aperture, the aperture being configured to allow one or more cables to pass through the first side.

12. The apparatus recited in claim 1, wherein the second side is configured to form an aperture, the aperture being configured to allow one or more cables to pass through the second side.

13. The apparatus recited in claim 1, further comprising at least one network interface panel, wherein the network interface panel is coupled to the first side of the chassis.

14. The apparatus recited in claim 13, wherein the at least one network interface panel is positioned lower than the first cable slack storage assembly and higher than the second cable slack storage assembly.

15. The apparatus recited in claim 13, wherein the at least one network interface panel includes a vertical routing channel.

16. The apparatus recited in claim 1, further comprising at least one network interface panel, wherein the network interface panel is coupled to the second side of the chassis.

17. The apparatus recited in claim 16, wherein the at least one network interface panel is situated lower than a fifth cable slack storage assembly and higher than a sixth cable slack storage assembly.

18. The apparatus recited in claim 1, wherein each of the cable spool assemblies includes a winding base coupled between a mounting flange and a retaining structure.

* * * * *

UNITED STATES PATENT AND TRADEMARK OFFICE
CERTIFICATE OF CORRECTION

PATENT NO.     : 6,487,356 B1
DATED          : November 26, 2002
INVENTOR(S)    : Harrison et al.

It is certified that error appears in the above-identified patent and that said Letters Patent is hereby corrected as shown below:

Column 14,
Line 49, after "cable" please insert -- routing --

Signed and Sealed this

Fifteenth Day of June, 2004

JON W. DUDAS
*Acting Director of the United States Patent and Trademark Office*